US009684603B2

(12) United States Patent
Solihin

(10) Patent No.: US 9,684,603 B2
(45) Date of Patent: Jun. 20, 2017

(54) MEMORY INITIALIZATION USING CACHE STATE

(71) Applicant: Empire Technology Development LLC, Wilmington, DE (US)

(72) Inventor: Yan Solihin, Raleigh, NC (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 21 days.

(21) Appl. No.: 14/603,277

(22) Filed: Jan. 22, 2015

(65) Prior Publication Data

US 2016/0217080 A1 Jul. 28, 2016

(51) Int. Cl.
*G06F 12/08* (2016.01)
*G06F 12/0891* (2016.01)

(52) U.S. Cl.
CPC .. *G06F 12/0891* (2013.01); *G06F 2212/1044* (2013.01); *G06F 2212/6042* (2013.01)

(58) Field of Classification Search
CPC ............. G06F 12/0891; G06F 12/0902; G06F 12/0815; G06F 12/084; G06F 3/0608; G06F 9/30047
See application file for complete search history.

(56) References Cited

U.S. PATENT DOCUMENTS

| | | | | |
|---|---|---|---|---|
| 5,551,001 A * | 8/1996 | Cohen | ................. | G06F 12/0897 711/122 |
| 5,943,684 A * | 8/1999 | Arimilli | .............. | G06F 12/0811 711/141 |
| 6,044,478 A * | 3/2000 | Green | ................. | G06F 12/0815 711/141 |
| 6,374,330 B1 * | 4/2002 | Arimilli | .............. | G06F 12/0811 711/117 |
| 6,704,844 B2 * | 3/2004 | Arimilli | .............. | G06F 12/0831 711/118 |
| 6,779,086 B2 * | 8/2004 | Arimilli | .............. | G06F 12/0831 711/118 |
| 6,973,541 B1 * | 12/2005 | Williams | ............ | G06F 9/30047 711/118 |

(Continued)

FOREIGN PATENT DOCUMENTS

GB 2270781 A 3/1994

OTHER PUBLICATIONS

J. M. Tendler, J. S. Dodson, J. S. Fields, H. Le and B. Sinharoy, "POWER4 system microarchitecture," in IBM Journal of Research and Development, vol. 46, No. 1, pp. 5-25, Jan. 2002. doi: 10.1147/rd.461.0005.*
Click, C., "Azul's experiences with hardware/software co-design," Keynote at ECOOP '09, pp. 1-31 (Jul. 10, 2009).
Ekman, M., and Stenstrom, P., "A Robust Main-Memory Compression Scheme," in Proceedings of the 32nd annual international symposium on Computer Architecture (ISCA'05), pp. 74-85 (May 2005).

(Continued)

*Primary Examiner* — David X Yi
*Assistant Examiner* — Ramon A Mercado
(74) *Attorney, Agent, or Firm* — Turk IP Law, LLC

(57) ABSTRACT

Techniques are generally described for cache management in a processor with a cache. In response to receiving a bulk memory modification instruction, data blocks of the cache associated with the bulk memory modification instruction may be identified. A cache coherence state of the identified data blocks may also be identified. The updated cache coherence state may be indicative of a zero value of the data blocks and the cache coherence state of the identified data blocks may be updated without modification to a cache data array.

16 Claims, 9 Drawing Sheets

(56) References Cited

U.S. PATENT DOCUMENTS

| | | | |
|---|---|---|---|
| 7,028,147 B2* | 4/2006 | Wu | G06F 11/2097 711/150 |
| 7,355,601 B2* | 4/2008 | Andrews | G06T 15/005 345/502 |
| 2002/0062424 A1* | 5/2002 | Liao | G06F 9/30047 711/129 |
| 2003/0105929 A1* | 6/2003 | Ebner | G06F 12/084 711/144 |
| 2008/0235479 A1* | 9/2008 | Scales | G06F 3/0608 711/166 |
| 2010/0005246 A1* | 1/2010 | Beers | G06F 12/0831 711/146 |
| 2011/0119451 A1* | 5/2011 | Fuller | G06F 12/0893 711/144 |
| 2011/0145304 A1* | 6/2011 | Gray | G06F 9/3004 707/820 |
| 2014/0173255 A1* | 6/2014 | Thantry | G06F 9/30145 712/208 |
| 2014/0258635 A1* | 9/2014 | Hong | G06F 12/0891 711/133 |

OTHER PUBLICATIONS

Islam, M. M. and Stenstrom, P., "Zero-Value Caches: Cancelling Loads that Return Zero," 18th International Conference on Parallel Architectures and Compilation Techniques (PACT), pp. 237-245 (Sep. 2009).

Islam, M. M., et al., "Cancellation of Loads that Return Zero Using Zero-Value Caches," Proceeding ICS '09 Proceedings of the 23rd international conference on Supercomputing, pp. 493-494 (Jun. 2009).

Yang, X., et al., "Why Nothing Matters: The Impact of Zeroing," Proceeding OOPSLA '11 Proceedings of the 2011 ACM international conference on Object oriented programming systems languages and applications, pp. 307-324 (Oct. 2011).

"PowerPC™ Microprocessor Family: The Programmer's Reference Guide", Motorola Inc., (1995); https://www-01.ibm.com/chips/techlib/techlib.nsf/techdocs/852569B20050FF778525699600741775/$file/prg.pdf.

* cited by examiner

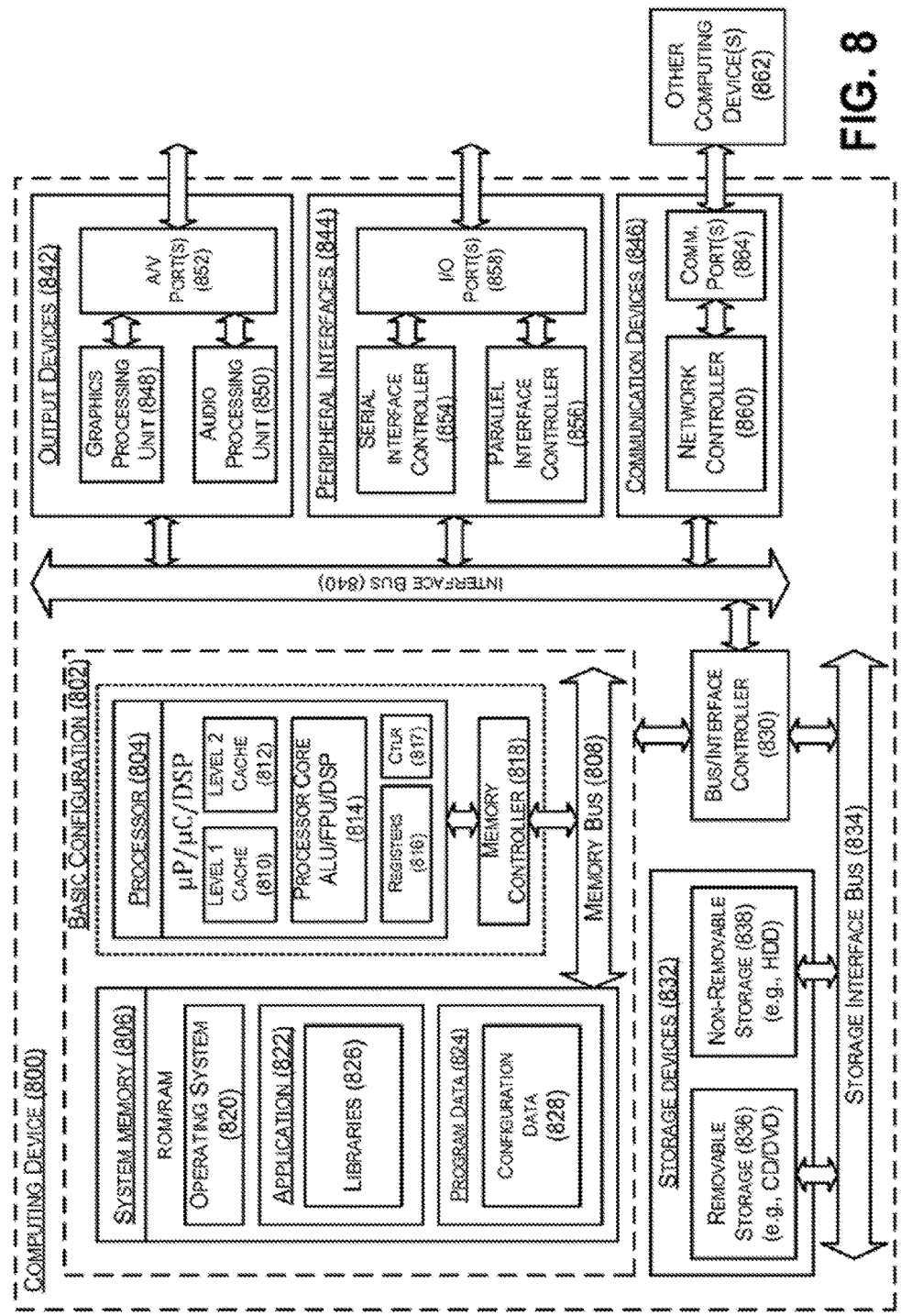

MEMORY INITIALIZATION USING CACHE STATE

BACKGROUND

Unless otherwise indicated herein, the materials described in this section are not prior art to the claims in this application and are not admitted to be prior art by inclusion in this section.

Memory safety may be a concern for system designers and programmers. As the amount of code increases, and code becomes more complex and multi-layered, measures to avoid memory corruption may become appropriate. Some managed languages such as Java, C#, and PHP provide mechanisms for zero initialization. Zero initialization mechanisms may involve the runtime system zeroing out memory regions that are requested for allocation by a program or thread. Some traditional languages such as C and C++ have also adopted zero initialization to improve memory safety.

SUMMARY

According to some examples, methods for cache management in a processor with a cache are provided. An example method may include receiving a bulk memory modification instruction, identifying one or more data blocks of the cache associated with the bulk memory modification instruction, and updating a cache coherence state of the identified one or more data blocks. The updated cache coherence state is indicative of a zero value of the one or more data blocks. The cache coherence state of the identified one or more data blocks is updated without modification to a cache data array.

Some examples describe processors that may include a core, a cache communicatively coupled to the core, and a cache controller communicatively coupled to the cache. An example processor may be configured to receive a bulk memory modification instruction, where one or more data blocks may be associated with the bulk memory modification instruction. The cache controller may be configured to determine that the one or more data blocks are to be initialized in response to the bulk memory modification instruction. When the data blocks are to be initialized, the cache controller may also be configured to update a cache coherence state of the one or more data blocks. The updated cache coherence state is indicative of an initialized value.

Additional examples describe a computer-readable storage medium that has stored thereon computer-readable instructions. The computer-readable instructions, when executed by one or more computing devices, may at least cause the one or more computing devices to identify a bulk memory modification instruction and identify a data block of a cache associated with the bulk memory modification instruction. The computer-readable instructions, when executed by one or more computing devices, may at least cause the one or more computing devices to update a cache coherence state of the identified data block. The updated cache coherence state is indicative of an initialized value of the data block. The cache coherence state of the identified data block may be updated without modification to a cache data array.

Some examples describe an apparatus. The apparatus may include a computing device with at least one processor that includes a cache and a cache controller. The computing device may be configured to receive a bulk memory modification instruction, determine that the one or more data blocks are to be initialized in response to the bulk memory modification instruction, and update a cache coherence state of the one or more data blocks. The updated cache coherence state is indicative of an initialized value in response to the determination that the one or more data blocks are to be initialized. The one or more data blocks may be associated with the bulk memory modification instruction.

Additional examples describe methods for cache management in a processor with a cache. In some examples, a bulk memory modification instruction is received and two or more data blocks of the cache associated with the bulk memory modification instruction are identified. Once the bulk memory modification instruction is identified, a cache coherence stated of the identified two or more data blocks are updated. The updated cache coherence state is indicative of a zero value of the data blocks. The cache coherence state of the identified two or more data blocks may be updated without modification to a cache data array.

The foregoing summary is illustrative only and should not be construed in any way to be limiting. In addition to the illustrative aspects, examples, and features described above, further aspects, examples, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 8 is a block diagram illustrating an example computing system, all arranged in accordance with at least some examples described herein.

DETAILED DESCRIPTION

Figure 1:
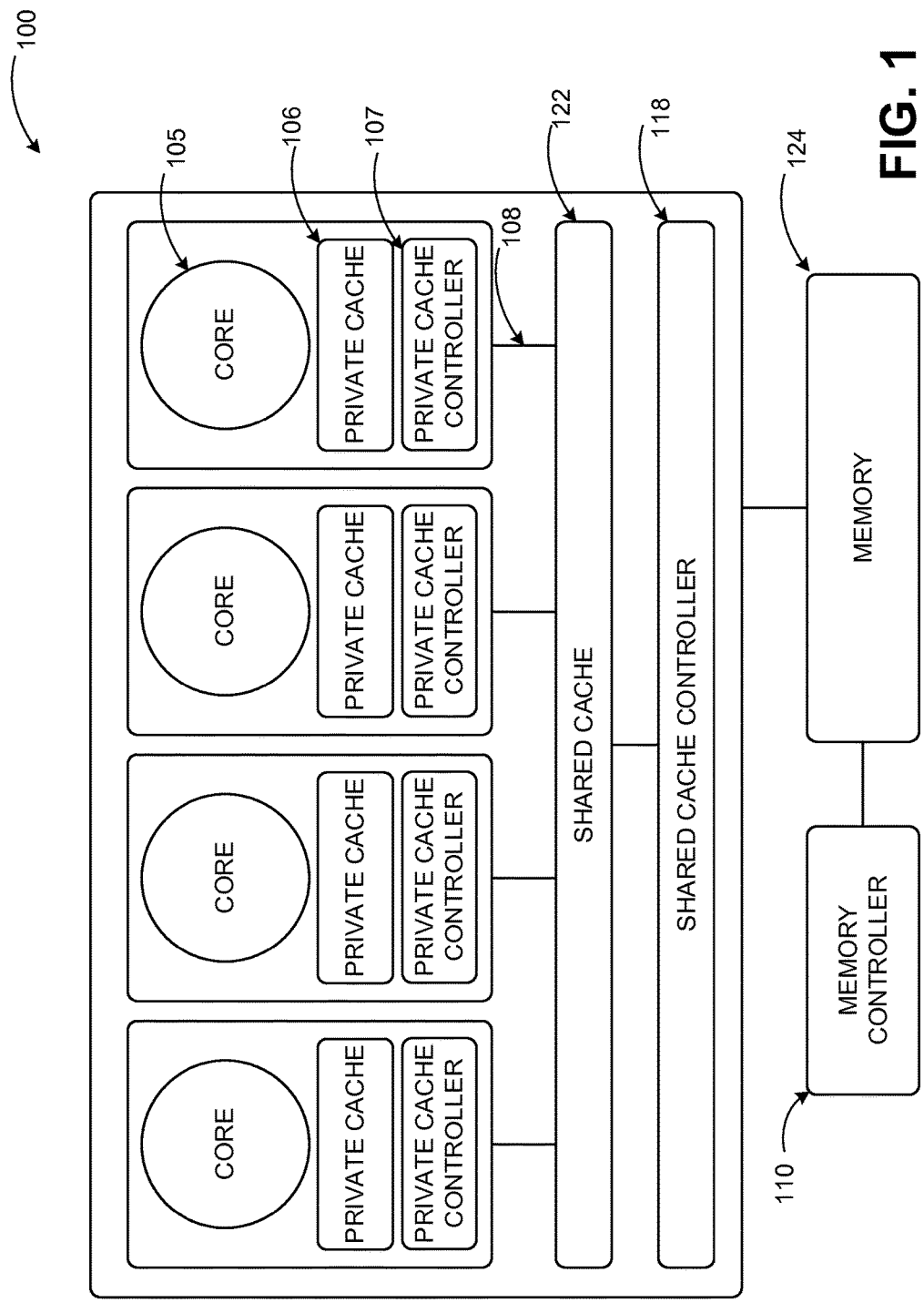
FIG. 1 is an illustration of an example processor coupled to a memory.

Various aspects of the disclosure are now described with regard to certain examples, which are intended to illustrate but not to limit the disclosure. The subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, other implementations may be performed in combination with other types of program modules. Generally, program modules may include routines, programs, components, data structures and other types of structures that perform particular tasks or implement particular abstract data types.

The subject matter described herein may be practiced on or in conjunction with other computer system configurations beyond those described herein, including multiprocessor systems, microprocessor-based or programmable consumer electronics, minicomputers, handheld computers, special-purpose hardware devices, network appliances, and the like.

In the following detailed description, references are made to the accompanying drawings that form a part hereof, and that show, by way of illustration, specific examples or examples. The drawings herein are not drawn to scale. Like numerals represent like elements throughout the several figures.

The disclosure is generally drawn, among other things, to methods, apparatus, systems, devices, and/or computer program products related to cache management in a processor with a cache.

Briefly stated, technologies are generally described for cache management in a processor with a cache. In response to receiving a bulk memory modification instruction, data blocks of the cache associated with the bulk memory modification instruction may be identified. A cache coherence state of the identified data blocks may also be identified. The updated cache coherence state may be indicative of a zero value of the data blocks and the cache coherence state of the identified data blocks may be updated without modification to a cache data array.

In managed languages, a program may request allocation of an object, for example by executing "obj=new classtype;" where classtype may be a class (a class may be a data structure and methods associated with the data structure). The method "new" may return a pointer to a newly created object. The newly created object may be referred to as "obj" for the remainder of the program. Execution of "new" may result in an allocation of a portion of memory of an appropriate size to store the object, and execution of an appropriate constructor to initialize the newly allocated object.

In certain implementations, the constructor may not necessarily initialize the entire allocated memory. In such implementations, to improve memory safety, the allocated memory may need to be initialized (for example, zeroed out) prior to execution of the constructor. Such initialization may consume a significant amount of the total execution time, often on the order of 10-20%. Such overhead may be undesirable.

As described previously, as the amount of code increases and as code becomes more complex and multi-layered, memory corruption may become a concern. Some managed languages such as Java, C#, and PHP may provide mechanisms for zero initialization. Zero initialization mechanisms may involve the runtime system zeroing out memory regions that are requested for allocation by a program or thread. Some traditional languages, such as C and C++ have, adopted zero initialization to improve memory safety. An increase in data transmission security and an improvement in process security may be seen through methods for cache management in a processor with a cache. An example method may include operations, such as receiving a bulk memory modification instruction, identifying one or more data blocks of the cache associated with the bulk memory modification instruction, and updating a cache coherence state of the identified one or more data blocks. The updated cache coherence state may be indicative of a zero value of the data blocks. The cache coherence state of the identified one or more data blocks may be updated without modification to a cache data array.

FIG. 1 is an illustration of a processor 100 coupled to a memory 124 arranged in accordance with at least some examples described herein. The processor 100 may include cores 105. Each of the cores 105 may be coupled to a respective private cache and a private cache controller 107. The cores 105 may also be coupled to a shared cache 122 and a shared cache controller 118 via communications fabric 108. A memory controller 110 may also be coupled to the processor 100 and the memory 124. The memory controller 110 may coordinate loading and maintaining transfer of data between, for example, the memory 124, the shared cache 122, and the private cache 106. The various components (for example, the cores 105, the private cache 106, the shared cache 122, the memory 124, etc.) may be operatively coupled to each other.

In operation, the private cache 106 and the shared cache 122 may store data and instructions that were recently accessed by the cores 105 of the processor 100. The memory controller 110 may be configured to facilitate management of data transfers between the processor 100 and the memory 124. The memory controller 110 may be further configured to request memory operations with the shared cache controller 118 and the private cache controller 107. The private cache controller 107 may be configured to facilitate management of the private cache 106 for the cores 105. The shared cache controller 118 may be configured to facilitate management of data exchanged between the memory 124 and the shared cache 122. The shared cache controller 118 and the private cache controller 107 may implement a cache coherence protocol such as MESI. In various example implementations described herein, the shared cache controller 118 may be configured to implement various techniques for cache management.

In an implementation of a MESI cache coherence protocol, a data block in the cache may be in one of the following states:

1. M (Modified): indicates that a data block may be dirty (having a value different from a value in the main memory) and exclusive to one private cache;

2. E (Exclusive): indicates that a data block may be clean and exclusive to one private cache;

3. S (Shared): indicates that a data block may be clean and not exclusive to one cache; and 4. I (Invalid): indicates that a data block may not be valid and its value may not be relied upon as correct.

In some examples, a cache coherence protocol may be implemented with additional cache states that correspond to zero-value variants of to one or more valid cache states, for example: MZ: Modified and Zero-valued; EZ: Exclusive and Zero-valued; and SZ: Shared and Zero-valued.

In some examples, a subset of the above zero-valued states may be implemented. In some examples, only state MZ may be implemented. These examples may be suitable for programs that follow an initialization (for example, zeroing in Java virtual machines) by executing a constructor. In such examples, the state likely to be used is state MZ, because an initialization instruction (for example, dcbz) may be followed by a write to the cache block.

Figure 2:
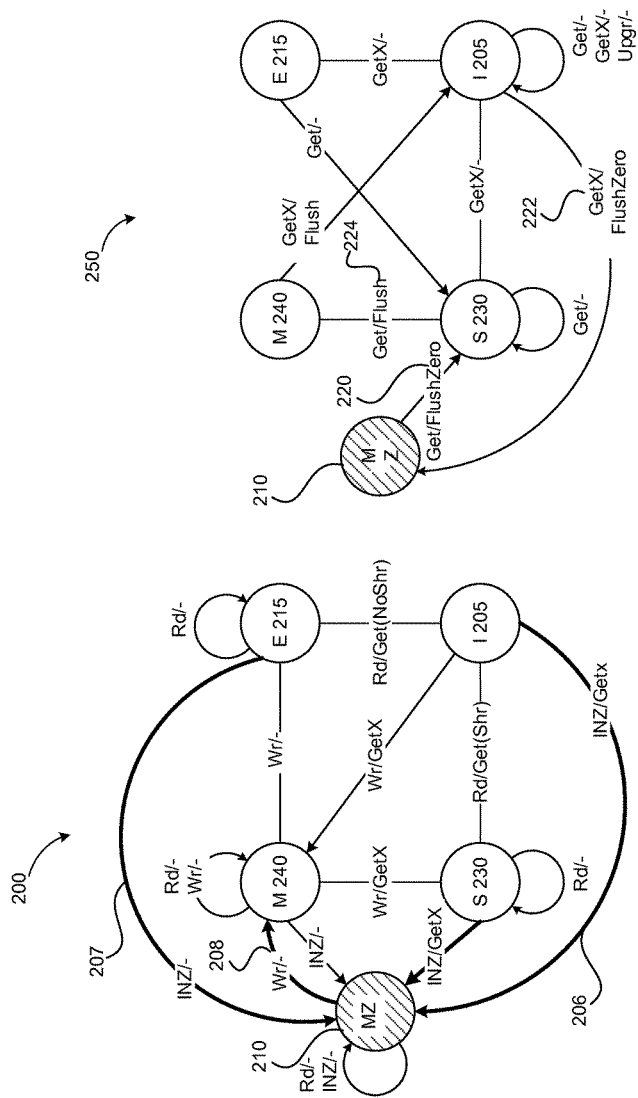
FIG. 2 is an illustration depicting state transitions for a data block in a cache in an example MESI protocol.

FIG. 2 is an illustration depicting state transitions for a data block in a cache in an example MESI protocol, arranged in accordance with at least some examples of the present disclosure. Diagram 200 and diagram 250 illustrated in FIG. 2 show an example MESI protocol that includes state MZ. In FIG. 2, Rd, Wr, and INZ may correspond to a read request, a write request, and a data block initialization request (for example, a request to update value of the data block to zero), respectively. Examples of an INZ request may include a data cache block zeroing instruction such as DCBZ in Power ISA and CLZ in Azul systems. Get and GetX may be coherence requests generated by the cache controller (for example, the private cache controller 107 of FIG. 1) to a communication fabric (for example, the communications fabric 108 of FIG. 1), corresponding to requests to access a block with an intention to read or write, respectively. The diagram 200 in FIG. 2 shows example state transitions for responding to a processor-generated event. The diagram 250 illustrates example state transitions for responding to external events received by the cache controller (for example, the shared cache controller 118 of FIG. 1).

An example protocol as illustrated in FIG. 2 may include a state I 205, a state MZ 210, a state E 215, a state S 230 and a state M 240. Processing may begin at the state MZ 210, which may correspond to a zero-value state or modified zero state (MZ). The state MZ 210 may be entered from any of the other states (for example, the state I 205, the state E 215, the state S 230, or the state M 240), when the block is zeroed by the cache controller (for example, the private cache controller 107 of FIG. 1) responsive to the initialization request INZ. Responsive to a write request (Wr) to a block, processing may transition from the state MZ 210 to the state M 240, which may correspond to the modified state (M).

Referring to the diagram 200 in FIG. 2, a block may be uncached or cached with the state I 205. When the processor requests to read the block, the block may transition to the state E 215 (if there are no other sharers, for example, other caches that keep the block) or to the state S 230 (if there are existing sharers). In the case of a write request from the processor, the block may transition to the state M 240. In addition, the shared cache controller 118 may post a GetX request on the communications fabric 108 in order to get an exclusive copy of the block. In this context, exclusive may refer to the block being invalidated from other sharers, and may not correspond to the state E 215.

If the request from the processor is due to an initialization instruction INZ (for example, zeroing the block), then the block may transition to the state MZ 210 after invalidating other sharers through GetX. When a block is in the state E 215, there may be no other caches that store the block. As such, the processor may be free to access the block without transitioning states or generating a coherence request. On a write, the cache controller may transition the cache block to the state M 240 to indicate that the block may be dirty. On an INZ, the block may transition to a new state MZ. No coherence requests may be made because there are no other sharers.

A block in the state S 230 may indicate that there are other caches that store the block. The processor may read from the block without transitioning block states or generating a coherence request. On a write, the block may transition to the state MZ 210 and copies of the block at other caches may be invalidated through the GetX coherence request. On an INZ, the block may transition to the state MZ 210, and a GetX coherence request may be generated in order to invalidate copies of the block at other caches.

When a block is in the state MZ 210, there may be no other sharers and the block may be dirty. The processor may be free to read and write from/to the block without transitioning block states or generating a coherence request. On receiving an INZ instruction, the shared cache controller 118 may transition the block to the state MZ 210 without generating a coherence request.

When a block is in the state MZ 210, the block may have zero value, there may be no other sharers, and the block may be dirty. The processor may be free to read and execute an INZ instruction from/to the block without transitioning states or generating a coherence request. On a write, the shared cache controller 118 may update the state of the block when the block is accessed. For example, when the block is accessed by a constructor, the shared cache controller 118 may change the value of the block from an initialized value to another value. Correspondingly, the state of the block may be changed to the state M 240.

The diagram 250 of FIG. 2 represents state transitions for a cache block due to an external request received by the cache/coherence controller. When the block is not found in the cache or the block is in the state I 205, external requests may be ignored. When the block is in the state E 215, an external Get request may indicate a read request for the block, and hence the block may transition to the state S 230. If the external request is GetX, the request may indicate that another cache controller is requesting to write to the block, and hence the block may transition to the state I 205. The block may thus be invalidated to allow the external requestor to get exclusive ownership of the block.

When the block is in the state S 230, an external Get request may indicate that another cache is requesting a read of the block and the block may remain in the state S 230. If the external request is GetX, the request may indicate that another cache is requesting a write to the block. Hence, the state may transition to the state I 205 and the block may be invalidated.

When the block is in the state M 240, an external Get request may indicate that another cache is requesting a read of the block. The cache storing the block in the state M 240 may give up exclusivity in this case and may transition the block to the state S 230. The block may be supplied to the requestor over the communications fabric 108 because it may be dirty. If the external request is GetX, the request may indicate that another cache wants to write to the block. If the block is in the state M 240, then the block may be flushed (for example, the block may be copied to main memory or a lower level cache and may be provided to the requestor and the block may transition to the state I 205). The block may thus be invalidated to allow the external requestor to get exclusive ownership of the block.

When the block is in the state MZ 210, an external Get request may indicate that another cache is requesting to read the block. The cache that stores the block in the state MZ 210 may relinquish exclusivity and transition the block to the state S 230. In comparison to the state MZ 210, the shared cache controller 118 may supply a zero-valued block through FlushZero 220. The difference between Flush 224 and the FlushZero 220 may be that for the Flush 224, the shared cache controller 118 may read the block from the data array of the cache. For the FlushZero 220, the shared cache controller 118 may return a block with an initialized or zero value. The data array of the cache may not be read for the FlushZero 220. If the external request is a GetX, this may indicate that another cache wants to write to the block, and the block may transition to the state I 205. The block may thus be invalidated to allow the external requestor to get exclusive ownership. The FlushZero 220 may supply a zero-valued or initialized block to the requestor. In this case, the data array of the cache may not be accessed.

It should be noted that variations from the illustrated MESI protocol are possible, and the state MZ 210 may be incorporated in such variations.

Returning to the diagram 200 in FIG. 2, frequent transitions with regard to the state MZ 210 may typically be from state E/S/I to the state MZ 210 due to bulk zeroing, followed by transitions from the state MZ 210 to the state M 240 due to initialization by constructors. The corresponding transitions are shown in thick lines 206, 207, and 208. Accordingly, in various examples such transitions may be optimized or otherwise configured, for example, to improve performance and reduce power consumption.

In a further example, zeroing of the block may be delayed until the block is to be accessed (for example, either read from or written to). In such an example of delayed zeroing, the following operations may be taken during the different state transitions:

1. Transition from state E/S/I to the state MZ 210: A processor core may execute an instruction (for example, an INZ instruction) that indicates a bulk memory modification instruction such as a bulk initialization operation. A bulk modification instruction may operate on two or more data blocks. When a bulk memory modification instruction is received by an individual core for a data block, a cache controller associated with the core (for example, the private cache controller 107) may first determine if a data block that corresponds to the request is present in the cache (for example, the private cache 106). If such a data block is identified in the cache, a state of the data block in the tag array may be updated. For example, the state of the data block may be changed from Exclusive ("E") to Modified and Zero-valued ("MZ") when the memory modification request is for zeroing out the data block. If the data block is not in the cache, a victim data block present in the cache may be evicted from the cache. The cache tag array may be updated to remove the tag of the victim data block. The tag array ma further be updated to add a tag for a data block that corresponds to the request. The value for the tag may then be marked as "MZ" in the tag, array. Fetching of the data block into the cache prior to initialization may thus be eliminated. Further, only the tag array may be updated for the data block, and accesses to the data array of the cache may be avoided. Energy savings may result.

2. Transition from the state MZ 210 to the state M 240: A data block may be written to after transitioning to a zero-valued state such as the state MZ 210. A cache controller may first receive a write instruction from, for example, the cores 105, the shared cache controller 118, or from the private cache controller 107. The cache controller may update the data array to write a data block value corresponding to the data block identified in the write instruction. The data that may be written may be padded with zeroes so that the write corresponds to the width of a cache block. For example, a byte/word/double word/quad word being written may be prepended and/or appended with zeroes to match the width of a cache block. Thus, an additional saving may be realized because the zeroing write may be avoided.

Figure 3:
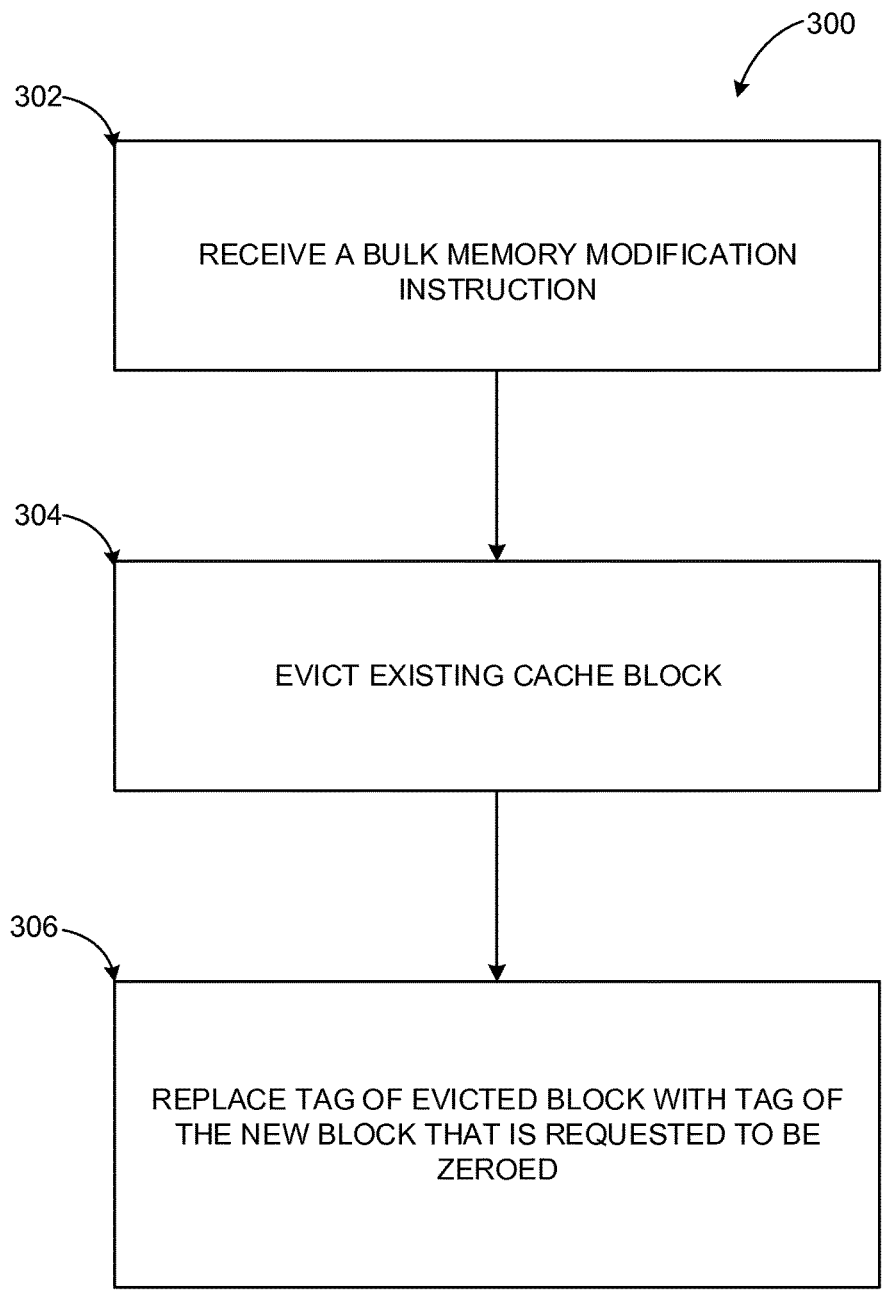
FIG. 3 is a flowchart depicting an example process for management of cache.

FIG. 3 is a flowchart depicting an example process 300 for management of cache, arranged in accordance with at least some examples described herein. In one example, a process or function for allocating memory may be implemented in a computing device or system comprising one or more processors and a memory. Example methods may include one or more operations, functions or actions as illustrated by one or more of blocks 302, 304, and/or 306.

Processing may begin at block 302, "RECEIVE A BULK MEMORY MODIFICATION INSTRUCTION." Block 302 may be followed by block 304. At Block 304, "EVICT EXISTING CACHE BLOCK", an existing victim block may be evicted in response to a request to zero a block. In response to such a request from, for example, the cores 105, the shared cache controller 118, or from the private cache controller 107, the victim block may be evicted to a lower level of the cache hierarchy or to the memory 124. In some examples, such eviction may be performed by removing cache tags for such data blocks from the cache tag array, without accessing the cache data array ("delayed zeroing"). In some examples, such as when a zero tag array (ZTA) is used, eviction of an existing cache block may not be needed. Block 304 may be followed by Block 306.

At Block 306, "REPLACE TAG OF EVICTED BLOCK WITH TAG OF THE NEW BLOCK THAT IS REQUESTED TO BE ZEROED", a tag of the evicted block may be replaced with the tag of the block that is requested to be zeroed. The state of the block may be marked as the state MZ 210. The operation of Block 306 may be carried out without fetching the block from memory. When a block in the state MZ is written to, the data being written may be prepended/appended with zeroes to match the cache block width, before the write is performed. The zeroing write may be eliminated in this manner.

The blocks included in the above described process are for illustrative purposes. In some examples, the blocks may be performed in a different order. In some other examples, various blocks may be eliminated. In still other examples, various blocks may be divided into additional blocks, supplemented with other blocks, modified, or combined together into fewer blocks.

Figure 4A:
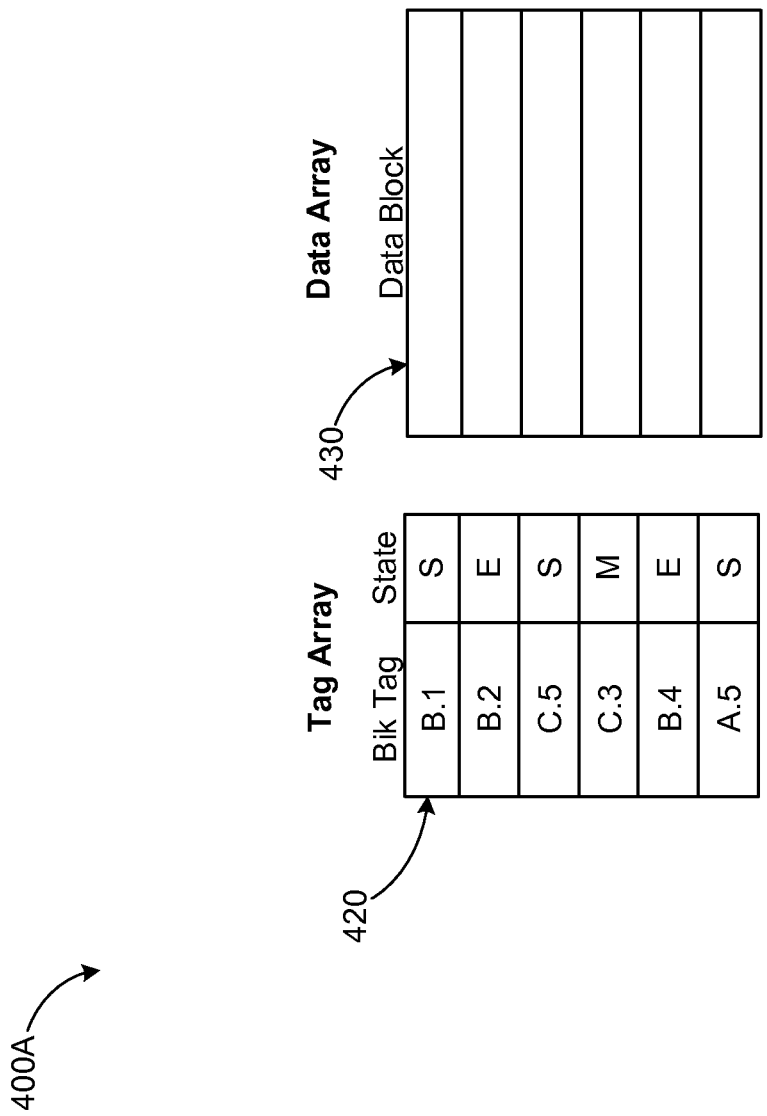
FIGS. 4A and 4B depict example cache arrays.

FIG. 4A depicts a cache array in 400A arranged according to some examples described herein. An example cache may include a data array 430 to store data blocks. The cache may further include a tag array 420 to store tags and a state corresponding to each tag. A tag may be effective to identify a corresponding data block in the data array. In the example shown in FIG. 4A, six blocks may be identified in the cache tag array, including: B.1, B.2, C.5, C.3, B.4, and A.5, in various cache states (M, E, or S).

An example bulk memory modification process may be performed as follows:

1. Receive a bulk memory modification instruction (for example, one or more INZ instructions).

2. Identify and evict one or more data blocks in the cache. In some examples, such eviction may be performed by removing cache tags for such data blocks without accessing the cache data array ("delayed zeroing").

3. Add one or more tags to the tag array 420. Each tag may correspond to a data block referred to in the bulk memory modification instruction.

4. For each tag added to the tag array 420, mark the state as "MZ" corresponding to a "modified and zero state" for the data block.

5. Receive a write instruction (for example, from a core, from a shared cache controller, or from a different cache controller).

6. Update the data array 430 to write a value corresponding to the data block identified in the data block update instruction.

7. Update the tag array 420 to indicate the state of data block as state M.

Alternatively or additionally, when a data block read instruction is received, the state of the data block may be changed from MZ to SZ.

Figure 5:
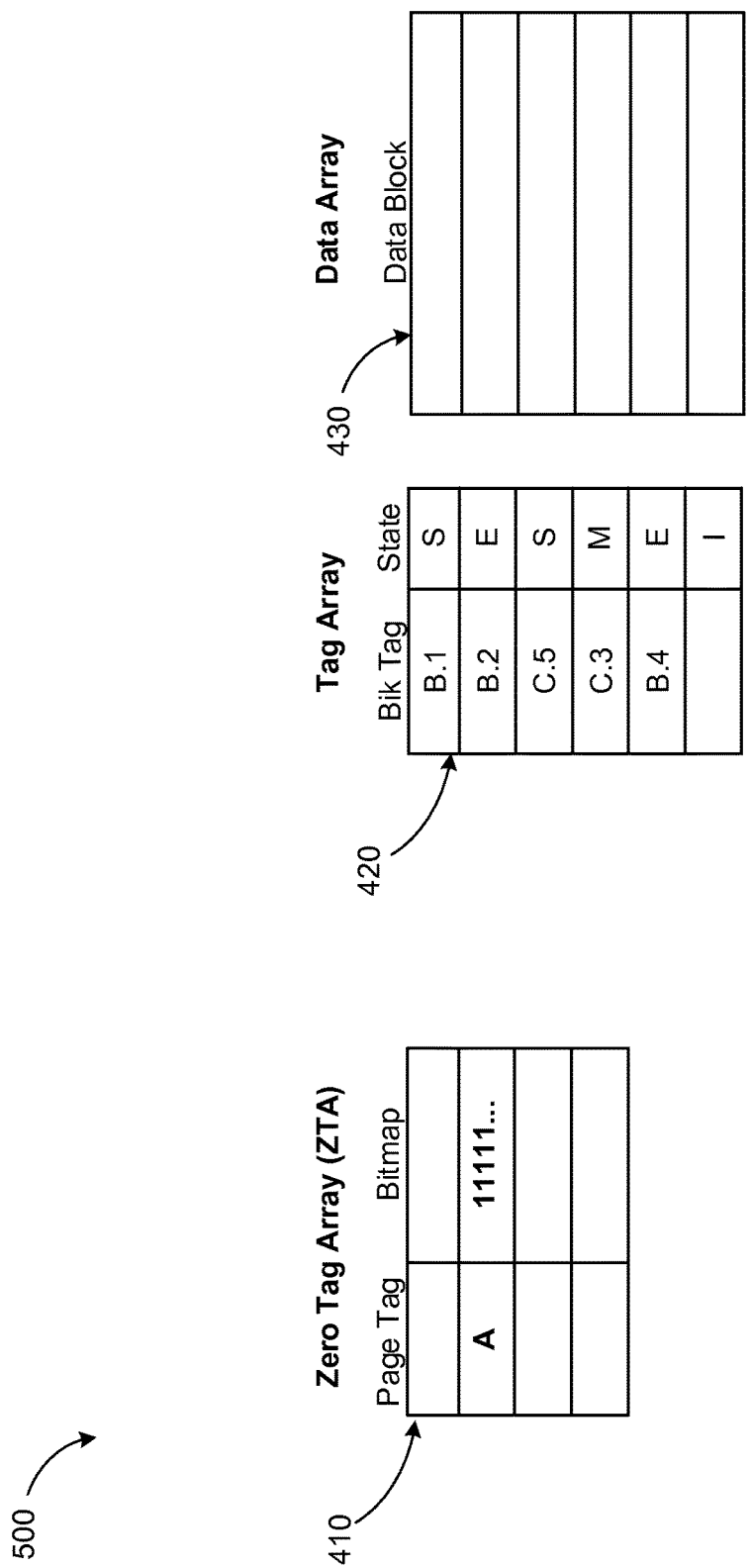
FIG. 5 depicts an example cache array.
Figure 6:
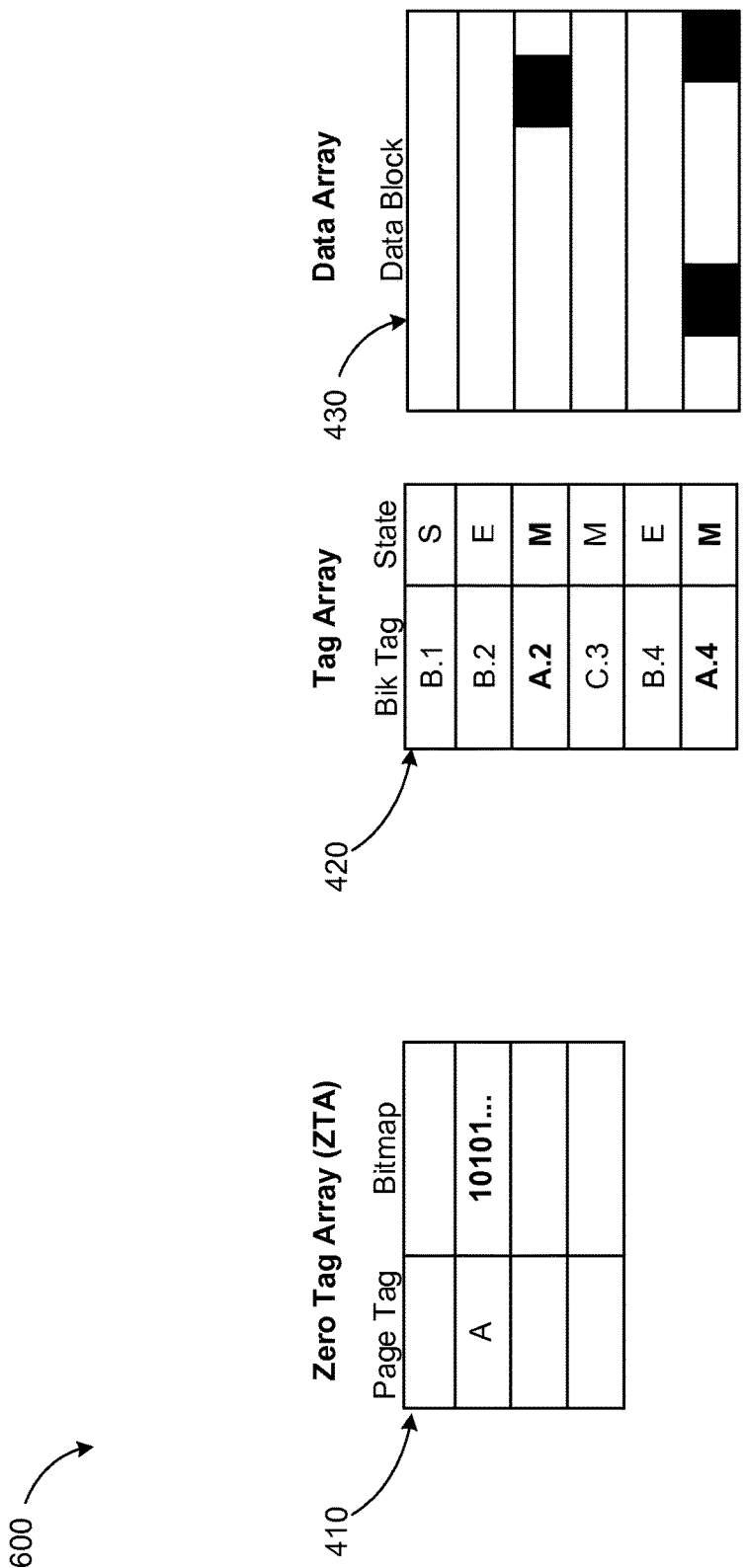
FIG. 6 depicts an example cache array with a zero tag array (ZTA)

In the example described in FIG. 4A, cache pollution may be incurred because the zero-value blocks still occupy space in the cache. As the number of blocks that are zeroed increases, many useful blocks may be evicted from the cache, which may lead to future cache misses on the evicted blocks. Such cache pollution may be relatively severe for the bulk zeroing approach because of the duration of time between when the blocks are zeroed and when the blocks are initialized by constructors. In order to avoid or otherwise reduce cache pollution, an additional operation/configuration may involve zero-space zeroing. In zero-space zeroing, a hardware structure to store the tags for zero-valued blocks may be implemented. Such a hardware structure may be referred to herein as a zero tag array (ZTA). The ZTA may be configured to store tags for zero-valued blocks, pages or other aggregates of blocks (for example, a page identifier followed by a bitmap as shown in FIGS. 4-6). In such implementations, the cache tag array may not have to store tags, thus freeing up the space in the cache so that the need for block eviction is reduced, thus reducing cache pollution.

In some examples, the ZTA may be organized in the same manner as the cache tag array. In some examples, the ZTA may be organized in a compact manner, leveraging implementations where a bulk memory modification instruction modifies a large and contiguous memory space. Thus, one tag may be used for a large fixed size region that coincides with the page size (for example, 4 KB). In a 4 KB page, there may be for example sixty four 64-byte blocks and a 64-bit map may be used to represent which of the blocks have a zero value, as illustrated in FIGS. 3, 4, and 5.

Figure 4B:
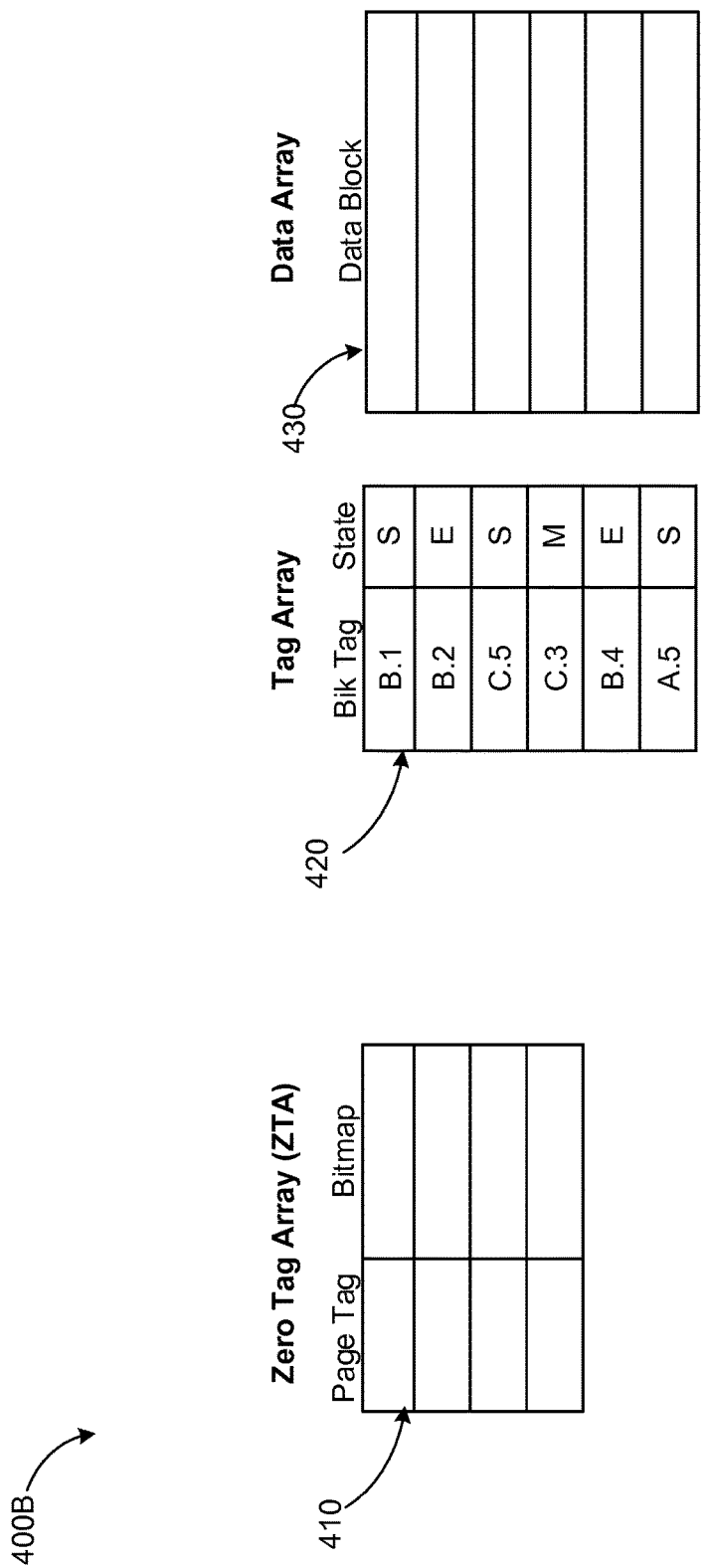

FIG. 4B depicts another cache array in 400B according to some examples described herein. An example cache may include a data array 430 to store data blocks. The cache may further include the tag array 420 to store tags and a state corresponding to each tag. A tag may be effective to identify a corresponding data block in the data array. The cache may further include a zero tag array (ZTA) 410. In some examples, the cache may further include an initialized tag array (ITA). The ZTA 410 may include tags effective to identify a memory page where each memory page may include several data blocks. The ZTA 410 may further include a bitmap corresponding to each page tag. The bitmap may be effective to identify the state of each data block within a page. In some examples, the bitmap may be effective to identify the state of a data block as "initialized." In some examples, the bitmap may be effective to identify the state of a data block as "zero." In some examples, the bitmap may be effective to identify the state of a data block as "not initialized."

FIG. 4B depicts a cache with an empty ZTA. For illustrative purposes, A, B, and C may be denoted as page addresses for three different pages and X.Y may indicate a specific block Y of a page X. The tag array 420 and data array 430 show that several data blocks are stored in the cache. For example, A.1 may indicate the first block of page A, A.2 may indicate the second block of page A, and so on. In the example shown in FIG. 4B, six blocks are identified in the cache tag array, including: B.1, B.2, C.5, C.3, B.4, and A.5, in various cache states (M, E, or S). An example bulk memory modification process may be performed as follows:

1. Receive a memory modification request spanning one or more pages. The request may be expressed, for example, as a set of INZ instructions or a single PAGEINZ instruction if supported.
2. Update the ZTA 410 to add a page tag for one or more pages that correspond to the bulk memory modification instructions.
3. Update the bitmap corresponding to each added page tag to zero values (that indicate initialized state).
4. Receive a write instruction (for example, from a core, from a shared cache controller, or from a private cache controller).
5. Update the data array 430 to write a data block value corresponding to the value of the bytes identified in the write instruction, pre-pended and appended with zero values to fill a data block size.
6. Update the array 420 to write a tag corresponding to the data block and update the cache state for the data block to "M".
7. Update the bitmap corresponding to the page to which the data block belongs, to reflect the non-zero (or non-initialized) value of the data block.

For a read instruction for a block, the ZTA 410 may return zero-valued data to the processor issuing the read instruction. For a read request from a different processor, a zero-valued data block may be provided to the processor and the state of the block may be marked in the tag array as "SZ".

FIG. 5 depicts an example cache array 500 arranged in accordance with various examples described herein. For example, a bulk memory modification including initializing may be performed for a region that includes page A, and a new entry in the ZTA 410 may be responsively created for page A. In this example, since all blocks of page A are initialized, the bitmap field may indicate a value of "1" for all blocks of the page. All blocks in the ZTA 410 may implicitly have state MZ and may be treated as such by the cache controller. For example, during operation, the cache controller may refer to the ZTA in addition to the tag array to determine the presence and state of a data block in the cache. For example, the cache controller may determine from the ZTA that data blocks from page A (for example, A.1, A.2, A.3 and so on) are cached and are in a modified and zero-valued (MZ) state.

In one example, block A.5 in the tag array 420 may be removed prior to updating the ZTA by clearing out the tag from the tag array 420. Removal of block A.5 from the tag array 420 may enforce mutual exclusivity between the ZTA 410 and the tag array 420. A cache controller may be configured to access both the ZTA and the cache tag array to determine the presence and state of a given data block in the cache. Because mutual exclusivity is enforced, cache space may be made available by blocks that are zeroed, thus avoiding cache pollution.

FIG. 6 depicts an example cache array 600 with a zero tag array (ZTA), in accordance with various examples described herein. A cache controller may receive a data block write instruction from, for example, a core, a shared cache controller, or from a different cache controller. The cache controller may update the data array to write a data block value corresponding to the data block identified in the data block write instruction. The cache controller may then update the tag array by writing a tag that corresponds to the data block, and cache state for the data block may be updated to state M. FIG. 6 illustrates that when blocks A.2 and A.4 are written by the processor using store instructions, they may be removed from the ZTA 410 by updating the second and fourth bits of the bitmap (corresponding to block A.2 and A.4 respectively) for page A to the value "0". Further, these blocks may be added into the tag array 420 in with state M. These initializations may not incur a cache miss if the data blocks are found in the ZTA 410. Thus, the ZTA 410 may introduce a beneficial prefetching effect. The parts of the blocks that are initialized are illustrated as black boxes in the data array 430.

The examples for optimization described herein, including delayed zeroing which does not rely on a ZTA, and zero-space zeroing which may be enabled by the ZTA, may reduce space overhead in the cache. For example, if there are sixteen threads running on a multicore chip with a 16 KB bulk zeroed region for each thread, bulk zeroing may incur a 16*16 KB=256 KB pollution in the cache. For an L2 or L3 cache with a capacity of 2 MB, this may amount to approximately 12.5% of the cache space being polluted, for example. If a ZTA organized as a regular tag array is used, then the overhead may be less. For a 52-bit physical address space, 4K entries may be needed for a total of 4K blocks, for example. For blocks that are 40-bit wide, the total space overhead may be 20 KB, for example. When a ZTA organized as a page tag array with bitmaps (for example, as shown in FIG. 5) is used, the overhead may be smaller, for example, 0.8 KB, corresponding to the size of the ZTA. Thus, ZTA organization may reduce space overhead.

In various examples, the techniques described herein may reduce or eliminate cache pollution. Cache misses (for example, fetching blocks to be zeroed out) may be reduced or eliminated by avoiding cache accesses (for example, by delayed zeroing or zero-space zeroing). In terms of power consumption, most programs may access objects only after the objects are initialized. Thus, writes due to zeroing and initialization may account for a large percentage of writes. If, for example, zeroing and initialization account for 50% of energy expended for writes, then the use of the techniques described herein may reduce the write energy by avoiding cache data array access during zeroing.

The use of zero-valued cache states and the zero tag array mechanism, which includes delayed zeroing and zero-space zeroing, may reduce or eliminate cache pollution because zeroed blocks may be kept in the ZTA and may not occupy cache space. Furthermore, zero-valued cache states and the zero tag array mechanism may provide low bandwidth pollution because zeroed blocks may not be written to memory as they are kept in the ZTA. Additionally, zero-valued cache states and the zero tag array mechanism may provide improved prefetching effects because zeroed blocks may remain in the ZTA for extended periods. Accordingly, initialization may not result in cache misses, may have very little instruction overhead because INZ works at cache block granularity, and may avoid redundant work because only the initialization writes end up accessing the cache.

Figure 7:
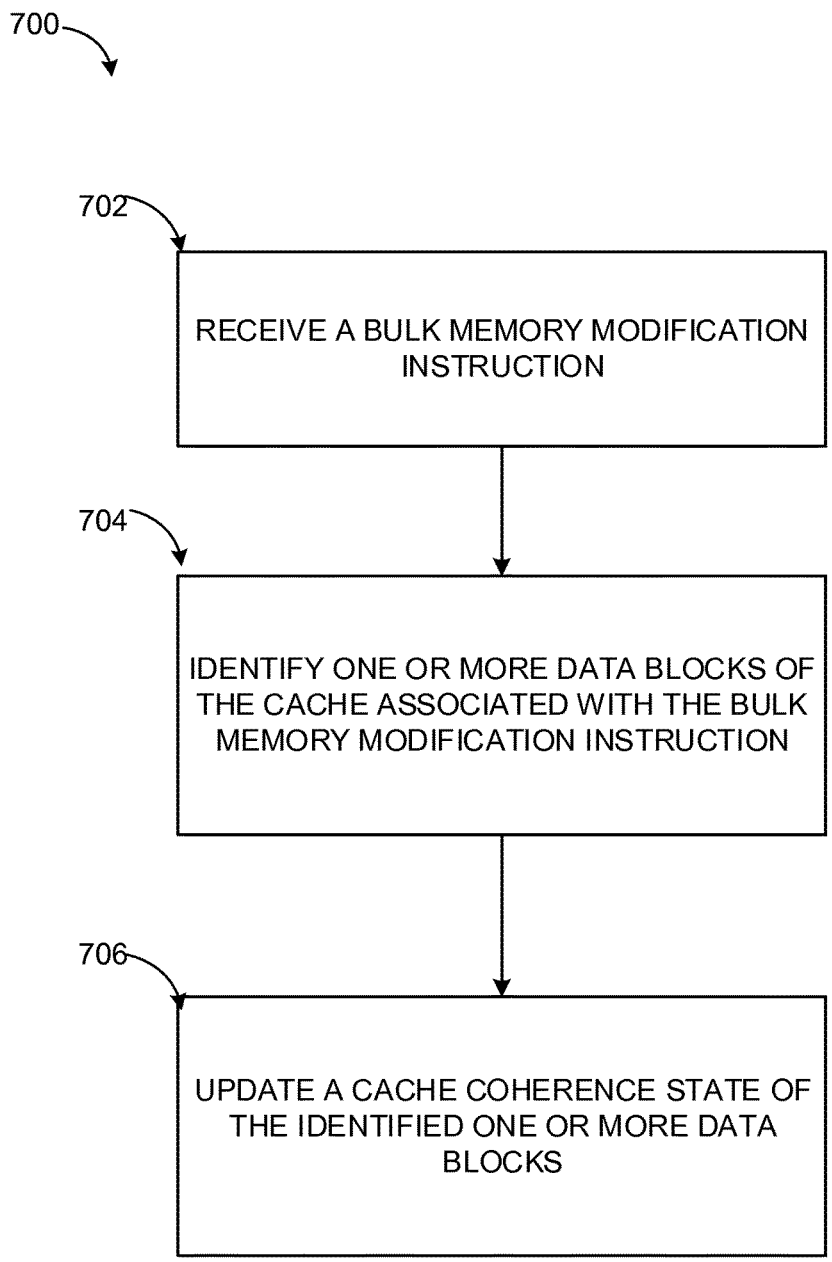
FIG. 7 is a flowchart depicting another example process for management of cache.

FIG. 7 is a flowchart depicting another example process 700 for management of cache, in accordance with at least some examples described herein. In an example, a process or function for allocating memory may be implemented in a computing device or system comprising one or more processing cores and a cache controller. Example procedures may include one or more operations, functions or actions as illustrated by one or more of blocks 702, 704, and/or 706.

Processing may begin at Block 702, "RECEIVE A BULK MEMORY MODIFICATION INSTRUCTION", where a cache controller may receive a memory modification request for two or more data blocks from, a core, from a shared cache controller, or from a different cache controller.

Block 702 may be followed by Block 704. At Block 704, "IDENTIFY ONE OR MORE DATA BLOCKS OF THE CACHE ASSOCIATED WITH THE BULK MEMORY MODIFICATION INSTRUCTION", the cache controller, in response to the request, may identify a data block associated with the memory modification request.

Block 704 may be followed by Block 706. At Block 706, "UPDATE A CACHE COHERENCE STATE OF THE IDENTIFIED ONE OR MORE DATA BLOCKS", a cache coherence state of the data block may be updated by the cache controller. The updated cache coherence state may be indicative of an initialized value (for example, a zero value) of the one or more data blocks. The cache coherence state of the identified one or more data blocks may be updated without modification to a cache data array. The processing blocks included in the above described process are for illustration purposes. In some examples, the processing blocks may be performed in a different order. In some other examples, various processing blocks may be eliminated. In still other examples, various processing blocks may be divided into additional processing blocks, supplemented with other processing blocks, modified, or combined together into fewer processing blocks.

The operational procedure may include updating the cache coherence state in a cache tag array. Encoding of the data block into a data array of a cache may be delayed until portions of the data block are to be read from or written to. In some examples, the cache coherence state of the data block may be updated using a MESI protocol. The MESI protocol may include a zero-value variant of the cache coherence states. Additionally and optionally, a zero tag array structure may be implemented to store tags for the data blocks. The zero tag array structure may be configured to store a tag corresponding to a memory page size (for example, 4 KB) and a corresponding bitmap.

Bulk memory modification may include bulk zeroing, for example, bulk zeroing performed by a Java virtual machine. A zeroing is considered bulk when it involves at least a cache block size, but may be as large as a region comprised of multiple pages. For example, FIG. 5 may illustrate the situation where there is bulk zeroing performed by a Java virtual machine for a region that includes page A. When portions of memory are allocated for objects from blocks A.2 and A.4, the specific bytes used for the allocation may depend on the memory allocator of the Java virtual machine. These regions may then be initialized by the appropriate constructors of the objects by initializing variables to default values (for example, zero values).

The present disclosure describes techniques that may reduce or eliminate cache pollution or bandwidth pollution due to memory initialization. Furthermore, the described techniques may provide a beneficial prefetching effect, may incur low instruction overhead, and may avoid redundant writes. Still further, the described techniques may utilize existing instructions such as dcbz and cls from an existing processor instruction set. These techniques for efficient initialization or zeroing of memory may be implemented in a processor without changes to the instruction set or to the software.

In one example, actual zeroing of a data block may be avoided and the new value of the data block (for example, zero) may be recorded in the metadata (for example, the cache state of the block). A write operation to initialize the data block may thus be avoided. Furthermore, power savings may be realized due to avoidance of cache accesses for initialization of the data block. Cache pollution and bandwidth pollution may also be avoided.

In one example, a technique to improve the efficiency of zeroing data is to avoid the writing of blocks. By avoiding the actual data zeroing, the data block may not be fetched into the cache, thus avoiding cache pollution. Furthermore, the data block may not be written in the cache, avoiding data array access in the cache. Still further, the data block may not be streamed to memory, avoiding bandwidth pollution. In various examples, the fact that a data block has an initialized or zero value is recorded in the metadata. In one example, the cache state of a block may be used to represent an initialized or zero value for the block.

Although the encoding of the value of a memory block in a cache state may be redundant because the value may be retrieved from the data block itself, there can be a number of advantages to encode the zero value using the cache state. A zero value may be common. A significant amount of dynamic loads may return a zero value. Events leading to zeroing may be known. The existence of block zeroing instructions, such as DCBZ in the IBM Power ISA or CLZ in the Azul ISA, are known and may be used to determine when a block's value transitions to zero, thus allowing for determination of whether a block has a zero value without scanning the value of the block. Encoding zero values in the cache state may avoid cache access. Instead of writing zeroes to a cache block in the cache data array, a cache state may transition to a new state in the cache tag array, completely or at least partially avoiding access to the data array. Since the tag array may be typically much smaller than the data array, significant power savings may be realized by at least partially avoiding accessing the data array. Encoding zero values in the cache state may allow for compression. Furthermore, a zero-value block does not actually need to reside in the data array since the cache state in the tag array efficiently encodes the block value. This frees up a cache line (the placeholder of a cache block) so that it may store a different block, effectively increasing the capacity of the cache. Encoding zero values in the cache state may decrease the number of redundant operations, since constructors for objects may overwrite most fractions of the allocated memory.

The foregoing detailed description has set forth various examples of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one example, several portions of the subject matter described herein may be implemented via application specific integrated circuits (ASICs), field programmable gate arrays (FPGAs), digital signal processors (DSPs), or other integrated formats. However, some aspects of the examples disclosed herein, in whole or in part, may be equivalently implemented in integrated circuits, as one or more computer programs running on one or more computers (for example, as one or more programs running on one or more computer systems), as one or more programs running on one or more processors (for example, as one or more programs running on one or more processors), as firmware, or as virtually any combination thereof, and that designing the circuitry and/or writing the code for the software and or firmware are possible in light of this disclosure. In addition, the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as processors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, other different components. Such depicted architectures are merely examples, and in fact, many other architectures may be implemented to achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected"—or "operably coupled"—to each other to achieve the desired functionality, and any two components capable of being so associated may also be viewed as being "operably couplable" to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

FIG. 8 depicts is a block diagram illustrating an example computing system where aspects of the present disclosure may be implemented. In particular, FIG. 8 is a block diagram illustrating a computing device 800 that is arranged for providing functionality, operations, and features in accordance with the present disclosure. In a very basic configuration 802, the computing device 800 typically includes one or more processors 804 and a system memory 806. A memory bus 808 may be used for communicating between the one or more processors 804 and system memory 806.

For example, the computing device 800 may be used as a server, desktop computer, portable computer, smart phone, special purpose computer, or similar device such as a controller. The basic configuration 802 is illustrated in FIG. 8 by those components within the inner dashed line. The computing device 800 may be implemented as a part of a general purpose or specialized server, mainframe, or similar computer that includes any of the above functions. The computing device 800 may also be implemented as a personal computer including both laptop computer and non-laptop computer configurations.

Depending on the desired configuration, the one or more processors 804 may be of any type including but not limited to a microprocessor (μP), a microcontroller (μC), a digital signal processor (DSP), or any combination thereof. The one or more processors 804 may include one or more levels of caching, such as a level one cache 810 and a level two cache 812, processor cores, and registers 816. A processor core 814 may include an arithmetic logic unit (ALU), a floating point unit (FPU), a digital signal processing core (DSP core), or any combination thereof. A memory controller 818 may also be used with the one or more processors 804, or in some implementations, the memory controller 818 may be an internal part of the one or more processors 804.

The one or more processors 804 may be a multicore processor. A multicore processor may comprise the processor core 814, each paired with the level one cache 810 and registers 816. The processor core 814 may, in some examples, share the level two cache 812 and one or more memory controllers. Numerous additional or alternative configurations and combinations may be utilized in conjunction with the practice of various aspects of the present disclosure. As discussed herein, the one or more processors 804 may include a cache controller 817. The cache controller 817 may be configured to perform zeroing or initialization operations when the processor core 814 receives a bulk memory modification instruction.

Depending on the desired configuration, system memory 806 may be of any type including but not limited to volatile memory (such as RAM), non-volatile memory (such as ROM, flash memory, etc.), or any combination thereof. System memory 806 may include an operating system 820, one or more applications 822, and program data 824. Application 822 may include libraries 826 that are arranged to perform various functions/operations or to store data or other content. Program data 824 may include configuration data 828 that may be useful for operation with the monitoring method described above. In some examples, application 822 may be arranged to operate with program data 824 on operating system 820. The basic configuration 802 is illustrated in FIG. 8 by those components within the inner dashed line.

The computing device 800 may have additional features or functionality and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. System memory 806, removable storage devices 836, and non-removable storage devices 838 are examples of computer storage media. Data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile and removable and non-removable media implemented in any method or technology for storage of information, such as computer readable instructions, data structures, program modules, or other data. Computer storage media includes, but is not limited to, RAM, ROM, EEPROM, flash memory or other memory technology, optical storage, magnetic cassettes, magnetic tape, magnetic disk storage or other magnetic storage devices, or any other medium that may be used to store the desired information and that may be accessed by the computing device 800. Any such computer storage media may be part of the computing device 800.

The computing device 800 may also include an interface bus 840 for facilitating communication from various interface devices (for example, output devices 842, peripheral interfaces 844, and communication devices 846) to basic configuration 802 via bus/interface controller 830. The output devices 842 may include a graphics processing unit 848 and an audio processing unit 850, which may be configured to communicate to various external devices such as a display or speakers via one or more A/V ports 852. The peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more I/O ports 858. The communication devices 846 may include a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 800 may also be implemented as a personal computer including both laptop computer and non-laptop computer configurations.

Examples may also include methods for cache management in a processor with a cache. These methods may be implemented in any number of ways, including the structures described herein.

A means for cache management in a processor with a cache may include a means for receiving a bulk memory modification instruction, a means for identifying one or more data blocks of the cache associated with the bulk memory modification instruction, and a means for updating a cache coherence state of the identified one or more data blocks. The updated cache coherence state is indicative of a zero value of the one or more data blocks. The cache coherence state of the identified one or more data blocks is updated without modification to a cache data array.

According to some examples, methods for cache management in a processor with a cache are provided. An example method may include receiving a bulk memory modification instruction, identifying one or more data blocks of the cache associated with the bulk memory modification instruction, and updating a cache coherence state of the identified one or more data blocks. The updated cache coherence state is indicative of a zero value of the one or more data blocks. The cache coherence state of the identified one or more data blocks is updated without modification to a cache data array.

According to the example method, updating the cache coherence state may include setting the cache coherence state of the identified one or more data blocks to a modified zero (MZ) state in a cache tag array. The example method may further include receiving a write instruction to write to a portion of a first data block of the one or more data blocks and writing to a portion of the first data block. The cache data array is modified to write to the first data block.

According to some examples, the method may further include upon receiving the write instruction, evicting a victim block from the cache. According to other examples, updating the cache coherence state may additionally include storing one or more tags in a zero tag array in the cache. The one or more tags may correspond to the one or more data blocks.

According to some examples, storing one or more tags may further include storing a first tag in the zero tag array. The first tag may correspond to a first data block of the one or more data blocks. The zero tag array may be effective to indicate the state of the first data block as a modified zero (MZ) state. According to examples, a tag in the zero tag array may correspond to a memory page. Updating the cache coherence state may further include updating a bitmap that corresponds to the tag in the zero tag array.

According to additional examples, the method may further include receiving a write instruction to write to a first data block of the one or more data blocks and writing to the first data block. The cache data array may be modified to write to the first data block. In response to writing to the first data block, the bitmap may be updated such that the bitmap is effective to identify a non-zero value for the first data block. In additional examples, the method may further include storing a cache tag corresponding to the first data block in the cache tag array. The cache tag may be effective to identify the first data block. The cache tag array may be effective to indicate the state of the first data block as a modified (M) state.

Some examples describe processors that may include a core, a cache communicatively coupled to the core, and a cache controller communicatively coupled to the cache. An example processor may be configured to receive a bulk memory modification instruction, where one or more data blocks may be associated with the bulk memory modification instruction. The cache controller may be configured to determine that the one or more data blocks are to be initialized in response to the bulk memory modification instruction. When the data blocks are to be initialized, the cache controller may also be configured to update a cache coherence state of the one or more data blocks. The updated cache coherence state is indicative of an initialized value.

According to further examples, the processor may be further configured to receive an instruction to write to a portion of a first data block of the one or more data blocks. In response to receipt by the processor of the instruction to write to the portion of the first data block, the cache controller may be further configured to write to a cache data array of the processor to update the first data block. According to some examples, the cache may include a zero tag array. The tag of the zero tag array may correspond to a memory page. According to further examples, the zero tag array may include a bitmap that corresponds to the tag.

According to additional examples, the processor may be further configured to receive a write instruction to write to a first data block of the one or more data blocks. The processor may be further configured to write to the first data block. A cache data array may be modified to write to the first data block. In response to execution of the write to the first data block, the processor may be further configured to update the bitmap such that the bitmap is effective to identify a non-zero value for the first data block.

According to some examples, the cache controller may be further configured to store a cache tag corresponding to the first data block in the cache data array. The cache tag may be effective to identify the first data block. The cache data array may be effective to indicate the state of the first data block as a modified (M) state.

Additional examples describe a computer-readable storage medium that has stored thereon computer-readable instructions. The computer-readable instructions, when executed by one or more computing devices, may at least cause the one or more computing devices to identify a bulk memory modification instruction and identify a data block of a cache associated with the bulk memory modification instruction. The computer-readable instructions, when executed by one or more computing devices, may at least cause the one or more computing devices to update a cache coherence state of the identified data block. The updated cache coherence state is indicative of an initialized value of the data block. The cache coherence state of the identified data block may be updated without modification to a cache data array.

According to further examples, the cache coherence state may be updated by storage of a tag corresponding to the data block in a zero tag array in the cache. A tag in a zero tag array may be configured to store a tag for a data block corresponding to a page size of memory page. The cache coherence state may be updated by a modification of a bitmap that corresponds to the tag in a zero tag array.

Some examples describe an apparatus. The apparatus may include a computing device with at least one processor that includes a cache and a cache controller. The computing device may be configured to receive a bulk memory modification instruction, determine that the one or more data blocks are to be initialized in response to the bulk memory modification instruction, and update a cache coherence state of the one or more data blocks. The updated cache coherence state is indicative of an initialized value in response to the determination that the one or more data blocks are to be initialized. The one or more data blocks may be associated with the bulk memory modification instruction.

A means for cache management in a processor with a cache may include a means for receiving a bulk memory modification instruction, a means for identifying two or more data blocks of the cache associated with the bulk memory modification instruction, and a means for updating a cache coherence state of the identified two or more data blocks. The updated cache coherence state may be indicative of a zero value of the data blocks. The cache coherence state of the identified two or more data blocks may be updated without modification to a cache data array.

Additional examples describe methods for cache management in a processor with a cache. In some examples, a bulk memory modification instruction is received and two or more data blocks of the cache associated with the bulk memory modification instruction are identified. Once the bulk memory modification instruction is identified, a cache coherence stated of the identified two or more data blocks are updated. The updated cache coherence state is indicative of a zero value of the data blocks. The cache coherence state of the identified two or more data blocks may be updated without modification to a cache data array.

According to additional examples, updating the cache coherence state may further include setting the cache coherence state of the identified two or more data blocks to a modified zero (MZ) state in a cache tag array. The method may additionally include receiving a write instruction to write to a portion of a first data block of the two or more data blocks and writing to a portion of the first data block. The cache data array may be modified to write to the first data block a write value and pre-pending or appending the first data block with zero value data to fill a size of the first data block.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The present disclosure is not to be limited in terms of the particular examples described in this application, which are intended as illustrations of various aspects. Many modifications and variations may be made without departing from its spirit and scope. Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, systems, or components, which may, of course, vary. The terminology used herein is for the purpose of describing particular examples only, and is not intended to be limiting.

In addition, the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disk (DVD), a digital tape, a computer memory, etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples are possible. The various aspects and examples disclosed herein are for purposes of illustration and are not intended to be limiting, with the true scope and spirit being indicated by the following claims.

What is claimed is:

1. A method for cache management in a processor with a cache, the method comprising:
receiving a bulk memory modification instruction;
identifying one or more data blocks of the cache associated with the bulk memory modification instruction;
updating a cache coherence state of the identified one or more data blocks to a modified zero (MZ) state in a cache to array, wherein:
the updated cache coherence state is indicative of a zero value of the identified one or more data blocks, and
the cache coherence state of the identified one or more data blocks is updated without modification to a cache data array;
in response to receipt of a write instruction to write to a portion of a first data block of the one or more data blocks, modifying the cache data array to write to the portion of the first data block and transitioning a cache coherence state of the first data block from the MZ state to a modified (M) state in the cache tag array to indicate that the first data block potentially has a modified value and is exclusive to the cache; and
in response to receipt of an external GetX request that indicates that another cache has requested to write to the first data block, transitioning the cache coherence state of the first data block from the M state to an invalid (I) state.

2. The method of claim 1, further comprising:
after receipt of the write instruction, evicting a victim block from the cache.

3. The method of claim 1, wherein updating the cache coherence state comprises:
storing one or more tags in a zero tag array in the cache, wherein the one or more tags correspond to the one or more data blocks.

4. The method of claim 3, wherein:
storing the one or more tags comprises storing a first tag in the zero tag array,
the first tag corresponds to the first data block of the one or more data blocks, and
the zero tag array is effective to indicate the cache coherence state of the first data block as the MZ state.

5. The method of claim 3, wherein:
a tag in the zero tag array corresponds to a memory page, and
updating the cache coherence state comprises updating a bitmap that corresponds to the tag in the zero tag array.

6. The method of claim 5, further comprising:
in response to the write to the portion of the first data block, updating the bitmap such that the bitmap is effective to identify a non-zero value for the first data block.

7. The method of claim 6, further comprising:
storing a cache tag, corresponding to the first data block in the cache tag array, wherein the cache tag is effective to identify the first data block and wherein the cache to array is effective to indicate the cache coherence state of the first data block as the M state.

8. A processor, comprising:
a core;
a cache communicatively coupled to the core; and
a cache controller communicatively coupled to the cache, wherein: the processor is configured to receive a bulk memory modification instruction,
one or more data blocks are associated with the bulk memory modification instruction, and
the cache controller is configured to:
in response to the bulk memory modification instruction, determine that the one or more data blocks are to be initialized;
in response to the determination that the one or more data blocks are to be initialized, update a cache coherence state of the one or more data blocks, wherein the updated cache coherence state is indicative of an initialized value; and
in response to receipt of a read instruction to read the one or more data blocks, transition the cache coherence state of the one or more data blocks from a modified zero (MZ) state to a shared zero (SZ) state to indicate that the one or more data blocks are clean and not exclusive to the cache, wherein the SZ state is a shared and zero-valued state.

9. The processor of claim 8, wherein: the processor is further configured to
receive an instruction to write to a portion of a first data block of the one or more data blocks, and
in response to receipt, by the processor, of the instruction to write to the portion of the first data block, the cache controller is further configured to write to a cache data array of the processor to update the first data block.

10. The processor of claim 8, wherein the cache comprises a zero tag array.

11. The processor of claim 10, wherein a tag of the zero tag array corresponds to a memory page.

12. The processor of claim 11, wherein the zero tag array comprises a bitmap that corresponds to the tag.

13. The processor of claim 12, wherein the processor is further configured to:
receive a write instruction to write to a first data block of the one or more data blocks;
write to the first data block, wherein a cache data array is modified to write to the first data block; and
in response to execution of the write to the first data block, update the bitmap such that the bitmap is effective to identify a non-zero value for the first data block.

14. The processor of claim 8, wherein: the cache controller is configured to
store a cache tag, corresponding to a first data block of the one or more data blocks, in a cache data array,
the cache tag is effective to identify the first data block; and
the cache data array is effective to indicate a cache coherence state of the first data block as a modified (M) state.

15. An apparatus, comprising:
a computing device with at least one processor that includes a cache and a cache controller, the computing device configured to:
receive a bulk memory modification instruction, wherein one or more data blocks are associated with the bulk memory modification instruction;
in response to the bulk memory modification instruction, determine that the one or more data blocks are to be initialized;
in response to the determination that the one or more data blocks are to be initialized, update a cache coherence state of the one or more data blocks, wherein the updated cache coherence state is indicative of an initialized value; and
in response to receipt of a read instruction to read the one or more data blocks, transition the cache coherence state of the one or more data blocks to a shared zero (SZ) state to indicate that the one or more data blocks are clean and not exclusive to the cache, wherein the SZ state is a shared and zero-valued state.

16. The apparatus of claim 15, wherein the computing device is further configured to:
in response to receipt of a request from another cache, provide the one or more data blocks to the another cache and one of:
transition the cache coherence state of the one or more data blocks to a shared (S) state if the request is to read the one or more data blocks; and
transition the cache coherence state of the one or more data blocks to an invalid (I) state if the request is to write to the one or more data blocks.

* * * * *

UNITED STATES PATENT AND TRADEMARK OFFICE
CERTIFICATE OF CORRECTION

PATENT NO. : 9,684,603 B2  
APPLICATION NO. : 14/603277  
DATED : June 20, 2017  
INVENTOR(S) : Solihin et al.

Page 1 of 1

It is certified that error appears in the above-identified patent and that said Letters Patent is hereby corrected as shown below:

In the Specification

In Column 7, Line 28, delete "array ma" and insert -- array may --, therefor.

In Column 7, Line 31, delete "tag, array." and insert -- tag array. --, therefor.

In the Claims

In Column 21, Line 9, in Claim 1, delete "cache to array," and insert -- cache tag array, --, therefor.

In Column 21, Line 55, in Claim 7, delete "cache tag, corresponding" and insert -- cache tag corresponding --, therefor.

In Column 21, Lines 57-58, in Claim 7, delete "cache to array," and insert -- cache tag array, --, therefor.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*